March 11, 1969     J. L. JENSEN     3,432,738

CURRENT DRIVEN VOLTAGE MULTIPLICATION CIRCUIT

Filed June 23, 1966

INVENTOR.
JAMES LEE JENSEN
BY Charles J. Ungemach
ATTORNEY

United States Patent Office 3,432,738
Patented Mar. 11, 1969

3,432,738
CURRENT DRIVEN VOLTAGE MULTIPLICATION CIRCUIT
James Lee Jensen, Frankfurt am Main, Germany, assignor to Honeywell Inc., Minneapolis, Minn., a corporation of Delaware
Filed June 23, 1966, Ser. No. 559,826
U.S. Cl. 321—15        11 Claims
Int. Cl. H02m 3/14

ABSTRACT OF THE DISCLOSURE

A circuit for performing a voltage multiplication function having a capacitor diode multiplier driven by a current feedback transistor inverter.

---

The present invention pertains generally to voltage multiplication circuits. More particularly the present invention pertains to providing improved means for driving a conventional capacitor-diode voltage multiplier.

Capacitor-diode voltage multipliers are well known in the art. Voltage multiplication or division may be accomplished by alternately charging single capacitors from a DC source and subsequently discharging them in a series connection into an output line. Switching means must be provided to alternately connect the supply voltage to different points in the circuit for the purpose of charging various capacitors. Conventionally this has been accomplished with inductive converters. Such arrangements require iron core transformers which are bulky and also impose limitations on the operating frequencies of the circuit. To alleviate some of these problems, it has been suggested to use a transistor switch wherein the drive to the transistor is obtained from a feedback transformer of the type illustrated in U.S. Patent 2,774,878. In such an arrangement, the switching of the transistors is accomplished through voltage feedback.

The specific improvement of the present invention is achieved by providing a transistor inverter in which current feedback is utilized to achieve the switching. This feature will be found particularly important in applications where the output of the voltage multiplier is used to energize capacitive or changing loads. In its simplest form the circuit is shown as a capacitive-diode voltage doubler. The circuit can, however, be expanded to a voltage tripler, quadrupler, or any integral multiplier. The output of such a circuit will be a multiple of the input voltage minus a certain amount due to diode voltage drop and loading effects. Consequently, the circuit may find use in voltage converters such as 6 to 12 volts, 6 to 24 volts, or 12 to 24 volts. Such a circuit can be operated at a high frequency and, since it doesn't require an output transformer, can be of light weight and small size.

It is, therefore, an object of the present invention to provide an improved voltage multiplier circuit.

A more particular object of the present invention is to provide a capacitive-diode voltage multiplier circuit driven by a transistor switch with current feedback.

These and further objects will become more apparent to those skilled in the art upon examination of the following specification, claims, and drawings, of which:

Figure 1:
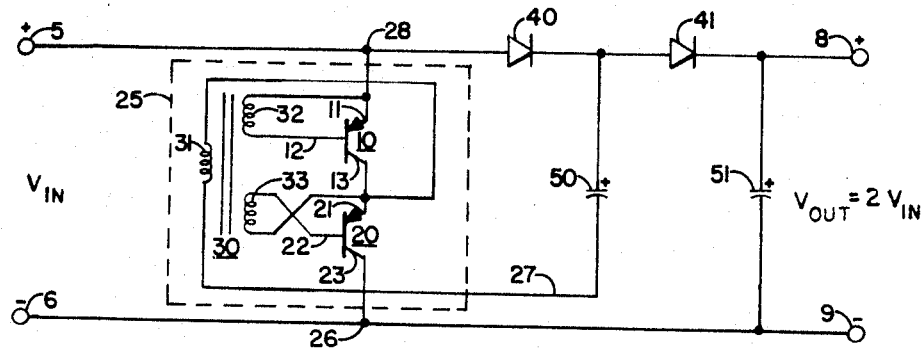
FIGURE 1 is a schematic circuit diagram illustrating a capacitor-diode voltage doubler according to the present invention.

Referring now to FIGURE 1, a pair of transistors 10 and 20 are provided. Transistor 10 has an emitter electrode 11, a base electrode 12, and a collector electrode 13. Transistor 20 has an emitter electrode 21, a base electrode 22, and a collector electrode 23. Emitter electrode 11 of transistor 10 is connected to one end of a secondary winding 32 of a transformer 30. The other end of secondary winding 32 is connected to base electrode 12. Transformer 30 has another secondary winding 33 which is connected between base electrode 22 and emitter 21 of transistor 20. Transformer 30 also has a primary winding 31.

A pair of diodes 40 and 41 and a pair of capacitors 50 and 51 are provided. One end of primary winding 31 of transformer 30 is connected to collector electrode 13 of transistor 10 and to emitter electrode 21 of transistor 20. The other end of winding 31 is connected to one side of capacitor 50. The other side of capacitor 50 is connected to the anode of diode 41 and to the cathode of diode 40. The anode of diode 40 is connected to emitter electrode 11 of transistor 10 and to an input terminal 5 which is adapted for connection to a positive potential of a DC supply source. The cathode of diode 41 is connected to an output terminal 8 and also to one side of capacitor 51. The other side of capacitor 51 is connected to a second output terminal 9, collector 23 and also to a second input terminal 6, input terminal 6 being adapted for connection to the negative terminal of said DC supply voltage source. While DC voltage source is connected between input terminals 5 and 6, an output signal of approximately double the input voltage may be obtained between output terminals 8 and 9. Transistors 10 and 20, together with the feedback arrangement through transformer 30 comprise a switching means identified by number 25. Switching means 25 is shown to have terminals 26, 27 and 28.

Figure 2:
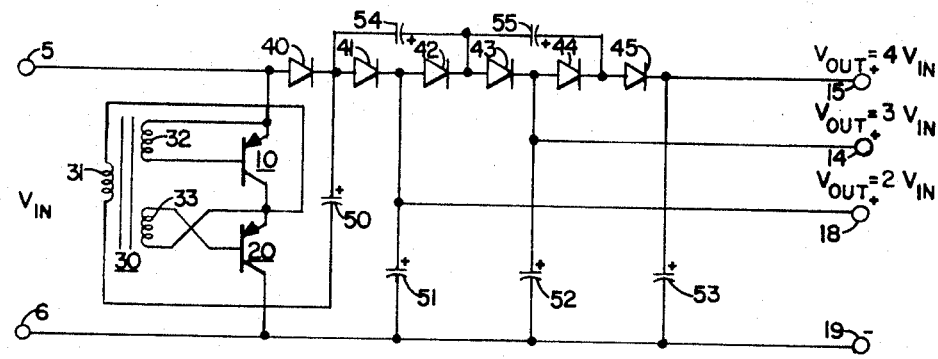
FIGURE 2 illustrates a voltage multiplier circuit providing outputs which are multiples of the input voltage.

In FIGURE 2 transistors 10 and 20 are shown similarly connected to windings 32 and 33 of transformer 30. Emitter electrode of transistor 10 is connected to input terminal 5, while the collector electrode of transistor 20 is connected to input terminal 6. The collector electrode of transistor 10 is connected directly to the emitter electrode of transistor 20.

Diodes 40, 41, 42, 43, 44 and 45 are shown in FIGURE 2 connected in a series fashion such that the cathodes of diodes 40, 41, 42, 43 and 44 are connected to the anodes of diodes 41, 42, 43, 44 and 45 respectively. The anode of diode 40 is connected to the input terminal 5 and also to the emitter electrode of transistor 10, while the cathode of diode 45 is connected to an output terminal 15. The primary winding 31 of transformer 30 is connected between the emitter electrode of transistor 20 and one end of the capacitor 50. The other end of capacitor 50 is connected to the anode electrode of diode 41. A capacitor 54 is connected between the anode electrode of diode 41 and the anode electrode of diode 43, and a capacitor 55 is connected between the anode electrode of diode 43 and the anode electrode of diode 45. A capacitor 51 is connected between the anode electrode of diode 42 and input terminal 6. An anode electrode of diode 42 is also connected to an output terminal 18. A capacitor 52 is connected between the anode electrode of diode 44 and the output terminal 19. The anode of diode 44 is also connected to an output terminal 14. A capacitor 53 is connected between output terminals 15 and 19. Output terminal 19 is connected directly to input terminal 6.

Figures 3, 4:
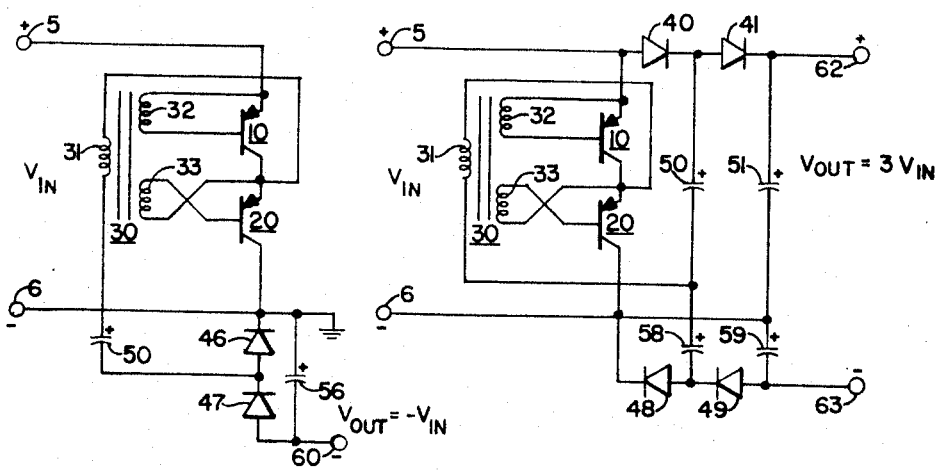
FIGURE 3 illustrates a circuit according to the present invention, which provides an output signal which is equal in magnitude to the input signal but of opposite polarity.
FIGURE 4 illustrates a voltage tripler according to the present invention.

In FIGURE 3, the switching circuit is identical to the switching circuit of FIGURES 1 and 2. Transistors 10 and 20 are interconnected with windings 32 and 33 of transformer 30 as explained above. The emitter electrode of transistor 10 is connected to input terminal 5 and collector electrode of transistor 20 is connected to output terminal 6. A pair of diodes 46 and 47 are shown connected in series, the cathode of diode 47 being connected to the anode of diode 46. A capacitor 50 is connected on one side to the anode of diode 46 and on the other side to one end of primary winding 31 of transformer 30. The other end of winding 31 is connected to the emitter electrode of transistor 20. The cathode of diode 46 is connected to input terminal 6 and to collector electrode of transistor 20, while the anode electrode of diode 47 is connected to an output terminal 60. A capacitor 56 is connected between output terminal 60 and input terminal 6. An application of the positive DC potential at input terminal 5 with respect to input terminal 6 will provide a negative output potential at output terminal 60 with respect to input terminal 6.

In FIGURE 4 the switching circuit again comprises transistors 10 and 20 and a transformer 30 with a plurality of windings. Transistors 10 and 20 are interconnected with windings 32 and 33 of transformer 30 as discussed above. A first pair of series connected diodes 40 and 41 are shown with the cathode of diode 40 connected to the anode of diode 41, and a second pair of diodes 48 and 49 are shown with the anode of diode of 48 connected to the cathode of diode 49.

Figure 5:
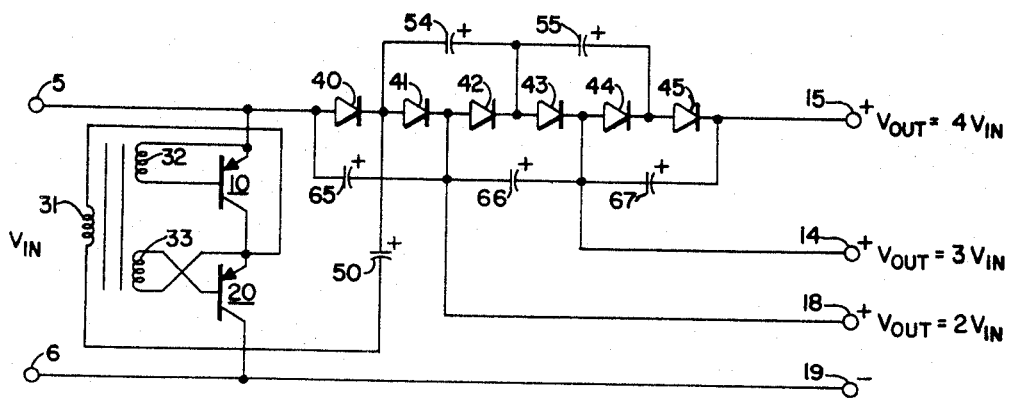
FIGURE 5 illustrates an alternative embodiment of a voltage multiplier circuit providing a number of output signals which are multiples of the input voltage.

FIGURE 5 illustrates an alternate embodiment for the circuit of FIGURE 2. Diodes 40, 41, 42, 43, 44 and 45 are connected in series as explained in the description with respect to FIGURE 2. The capacitors associated with these diodes are, however, interconnected in a different way. Capacitor 50 is again connected between the anode of diode 41 and one end of primary winding 31 of transformer 30. Capacitor 54 is connected between the anode of diode 41 and the anode of diode 43 and capacitor 55 is connected between the anode of diode 43 and the anode of diode 45. A capacitor 65 is connected between the anode of diode 40 and the anode of diode 42, a capacitor 66 is connected between the anode of diode 42 and the anode of diode 44, and a capacitor 67 is connected between the anode of diode 44 and the cathode of diode 45. The anode of diode 42 is also connected to an output terminal 18, the anode of diode 44 is connected to an output terminal 14 and the cathode of diode 45 is connected to an output terminal 15. Input terminal 6 is connected directly to an output terminal 19. Upon application of a DC input voltage between input terminals 5 and 6, the output voltages appearing at terminals 15, 16 and 18, measured with respect to the output terminal 19, are equal to four times, three times, and two times the amplitude of the input voltage respectively.

In FIGURE 1, input terminals 5 and 6 are adapted for connection to a DC supply source, terminal 5 to the positive and terminal 6 to the negative end of the source. Transistors 10 and 20 are alternately switched into conductive and nonconductive states in response to the current through winding 31 on transformer 30. While transistor 10 is conducting, transistor 20 is in its nonconductive state and alternately while transistor 20 is conducting transistor 10 is in its nonconducting state. It should be noted that the feedback transformer need not saturate, since the battery current decreases with time due to the capacitive load. However, for some applications, certain design advantages may be obtained by designing the feedback transformer to saturate.

During the portion of the cycle when transistor 20 is conducting, a low impedance current path may be traced from input terminal 5, through diode 40, through capacitor 50, through primary winding 31, and through transistor 20, from emitter to collector, to input terminal 6.

The current flowing in primary winding 31 of transformer 30 induces a voltage in secondary winding 33, causing a base current to flow in base terminal 22 of transistor 20 and hold it in the conducting state. It is clear that during this portion of the cycle terminal 27 of switching means 25 is very near the negative potential of input terminal 6. Almost the entire input voltage $V_{in}$ is therefore applied across capacitor 50, charging capacitor 50 toward plus $V_{in}$ potential. At the same time a low impedance path is provided from positive terminal 5 through diodes 40 and 41, through capacitor 51 back to the negative terminal 6. Capacitor 51 is, therefore, also charged toward the plus $V_{in}$ potential at this time. The voltage appearing momentarily between output terminals 8 and 9 is nearly equal to the input voltage.

The charging current through capacitor 50 also flows through primary winding 31 of transformer 30, causing the core of transformer 30 to go into saturation. The increased magnetizing current requirement reduces the current to base terminal 22, increasing the voltage drop from emitter to collector of transistor 20, further decreasing the current in primary winding 31. This degenerative process continues until the current in primary winding 31 is insufficient to hold the flux level in transformer 30, and the flux field begins to reduce or collapse. The collapsing field induces voltages of opposite polarity in feedback windings 32 and 33, such that a reverse bias is placed on the emitter-base junction of transistor 20 and a forward bias is placed on the emitter-base junction of transistor 10. Transistor 20 is thus turned into its nonconductive state and transistor 10 is turned into conduction. High impedance now exists between terminal 27 of switching means 25 and input terminal 6, and a low impedance current path exists between terminal 27 and positive input terminal 5. The negative end of capacitor 50 is, therefore, raised toward the potential of input terminal 5, forcing the positive side of capacitor 50, which was already charged to nearly plus $V_{in}$ potential prior to switching, to nearly plus $2V_{in}$. Diode 40 prevents the leakage of the charge from the positive side of capacitor 50 back into the source. This charge, however, is free to flow through diode 41 to the positive side of capacitor 51, raising the potential of capacitor 51 above $V_{in}$. After some cycles of switching means 25, the voltage on capacitor 51 is raised very close to $2V_{in}$. Continuous "pumping" of energy from the input source maintains the voltage on capacitor 51 close to $2V_{in}$ while the electric energy is being supplied to the load which may be connected between output terminals 8 and 9.

The operation of the apparatus of FIGURE 2 is very similar to the operation of the apparatus of FIGURE 1. The only difference is that additional voltage multiplication stages are added between the output of the circuit as shown in FIGURE 1 and the load. The operation of the circuit will be clear to those skilled in the art and a detailed description is not necessary. By providing the additional multiplication stages, it is possible to derive outputs which are multiples of the input. In practice, these outputs are reduced somewhat by the loading effect and diode voltage drops.

FIGURE 2 illustrates a voltage inverter circuit. When transistor 10 is conducting, capacitor 50 is charged to approximately the input voltage. When the switching occurs, transistor 20 conducts and the positive side of capacitor 50 is reduced to the negative potential of input terminal 6, pulling the negative side of capacitor 50 to potential below the potential of input terminal 6. This low potential on capacitor 50 causes the current to flow through diode 47 bringing the side of capacitor 56 connected to output terminal 60 to a potential below the negative potential of input terminal 6. Some cycles of operation after the initial application of a voltage between the input terminals, the voltage across capacitor 56 will be approximately equal to the input voltage.

FIGURE 4 illustrates a voltage tripler. This circuit is really a combination of FIGURES 1 and 3. The arrangement of diodes 40 and 41 together with capacitors 50 and 51 is responsible, as explained with reference to FIGURE 1, for bringing the potential at output terminal 62 to $V_{in}$ above the input terminal 6. At the same time, the arrangement of diodes 48 and 49 together with capacitors 58 and 59, is effective to bring the potential at output terminal 63 $V_{in}$ below the potential of input terminal 6. A net difference of $3V_{in}$ is thus established between output terminals 62 and 63.

The circuit of FIGURE 5 is very similar to that of FIGURE 2. One variation in FIGURE 5 is in that capacitors 65, 66 and 67 are arranged in series as compared to the parallel arrangement of capacitors 51, 52 and 53 of FIGURE 2. This rearrangement of the capacitors in series will allow lower voltage ratings on the capacitors. It may have a disadvantage, however, in that it will give more ripple.

Many other forms of voltage multipliers may be constructed using the basic transistor switching circuit of FIGURE 1. The most important advantage of this switching scheme is that it uses current feedback which is especially advantageously adapted for use in connection with capacitive loads. It should be noted that the feedback transformer need not saturate, since the primary current decreases with time due to the capacitive load. However, for some applications certain design advantages may be obtained by designing the feedback transformer to saturate. Another important advantage of all the circuits shown in this application is that the inverse voltage on the transistors does not exceed the supply voltage.

Many variations and embodiments are possible within the spirit of this invention. It is therefore understood that the particular embodiments shown here are for illustration purposes only and that the present invention is limited only by the scope of the appended claims.

I claim:
1. A current driven inverter comprising: first and second injut terminals for connection to points of first and second DC potential first and second output terminals for connection to a load, and a third terminal;
  means connecting said second output terminal to said second input terminal;
  means for alternately electrically connecting said first output terminal to said first and second input terminals respectively, said means including
  first and second transistors, each having an emitter, a collector and a base electrode, the emitter electrode of said first transistor being connected to said first input terminal, the collector electrode of said first transistor and the emitter electrode of said second transistor being connected to said third terminal, and the collector electrode of said second transistor being connected to said second input terminal,
  a transformer having a primary winding connected between said third terminal and said first output terminal, a first secondary winding connected between the base and the emitter electrodes of said first transistor, and a second secondary winding connected between the base and the emitter electrodes of said second transistor, said transformer further having a saturable core, and
  whereby the potential of said first output terminal is alternately switched between the potential of said first and second input terminals respectively in response to the current through said third terminal.

2. A current driven inverter comprising:
first and second input terminals for connection to points of first and second DC potential, first and second output terminals for connection to a load, and a third terminal;
means connecting said second output terminal to said second input terminal;
means for alternately electrically connecting said first output terminal to said first and second input terminals respectively, said means including
first and second transistors, each having an emitter, a collector and a base electrode, the emitter electrode of said first transistor being connected to said first input terminal, the collector electrode of said first transistor and the emitter electrode of said second transistor being connected to said third terminal, and the collector electrode of said second transistor being connected to said second input terminal,
a transformer having a primary winding connected between said third terminal and said first output terminal, a first secondry winding connected between the base and the emitter electrodes of said first transistor, and a second secondary winding connetced between the base and the emitter electrodes of said first transistor, and
a capacitive load connected to said output terminals, whereby said first output terminal is alternately connected to said first and second input terminals respectively in response to the current through said primary winding.

3. Apparatus of the class described, comprising:
first and second input terminals;
first and second output terminals;
switching means having first, second and third terminals and further having,
first semiconductor switching means connected between said first and third terminals;
second semiconductor switching means connected between said second and third terminals;
current responsive means connected to said third terminal and to each of said first and second semiconductor switching means for operating said semiconductor switching means in response to the current at said third terminal to alternately provide low impedance paths between said third and said first terminals and said third and said second terminals;
first and second diodes connected in series between said first input terminal and said first output terminal, said first diode having its anode connected to said first input terminal and said second diode having its cathoe connected to said first output terminal;
means connecting said first terminal of said switching means to said first input terminal and to said anode of said first diode, and means connecting said second terminal of said switching means to said second input terminal and to said second output terminal;
first and second capacitors;
means connecting said first capacitor between said third terminal of said switching means and said node of said second diode; and
means connecting said second capacitor between said first and second output terminals.

4. Apparatus according to claim 3, wherein said first and second semiconductor switching means are transistors and said current responsive means is a feedback transformer.

5. Apparatus of the class described, comprising:
first and second input terminals;
first and second output terminals;
switching means having first, second and third terminals and further having,
first semiconductor switching means connected between said first and third terminals;
second semiconductor switching means connected between said second and third terminals;
current responsive means connected to said third terminal and to each of said first and second semiconductor switching means for operating said semiconductor switching means in response to the current at said third terminal to alternately provide low impedance paths between said third and said first terminals and said third and said second terminals;
first and second diodes connected in series between first and second junction points;
means connecting said first terminal of said switching means to said first input terminal and to said first junction point and means connecting said second terminal to said switching means to said second input terminal;

means connecting said second junction point to said first output terminal;

first and second capacitors;

means connecting said first capacitor between said third terminal of said switching means and a junction intermediate said first and second diodes;

means connecting said second capacitor between said first and second output terminals; and means connecting said second output terminal to said first junction point.

6. Apparatus according to claim 5 wherein said second output terminal is further connected to said second input terminal.

7. Apparatus according to claim 5, wherein said first and second semiconductor switching means are first and second transistors each having a collector, an emitter and a base, and wherein said current responsive means includes a feedback transformer with a primary winding and first and second feedback windings and means for interconnecting said transistors and said windings including, means connecting the emitter of said first transistor to said first terminal, means connecting the collector of said first transistor to the emitter of said second transistor and means connecting the collector of said second transistor to said second terminal, means connecting said primary winding of said transformer between said third terminal and said collector of said first transistor, means connecting said first feedback winding of said transformer between the emitter and the base of said first transistor, and means connecting said second feedback winding of said transformer between the emitter and the base electrodes of said second transistor.

8. Apparatus of the class described, comprising:
first and second input terminals;
first and second output terminals;
switching means having first, second and third terminals and further having,
first semiconductor switching means connected between said first and third terminals;
second semiconductor switching means connected between said second and third terminals;
current responsive means connected to said third terminal and to each of said first and second semiconductor switching means for operating said semiconductor switching means in response to the current at said third terminal to alternately provide low impedance paths between said third and said first terminals and said third and said second terminals;
means connecting said first terminal of said switching means to said first input terminal and means connecting said second terminal of said switching means to said second input terminal and to said second output terminal;
a plurality of capacitor-diode voltage multiplier stages connected in series between said input and said output terminals, each said stage having,
a pair of diodes connected in series between first and second junction points,
a first capacitor connected between said second junction points in parallel with said pair of diodes,
and a second capacitor connected between a junction intermediate said two diodes of said pair and a third junction point,
means connecting said third junction point of the first stage in said series of stages to said third terminal of said switching means,
means connecting said first junction of said first stage to said first terminal of said switching means, and means connecting said second terminal of said switching means to said second output terminal;

means connecting said first junction point of each succeeding stage of said plurality of stages to said second junction of the immediately preceding stage, and means connecting said third junction point of each succeeding stage to said junction intermediate the two diodes of the immediately preceding stage; and means connecting the second junction of the last stage in said series of stages to said first output terminal.

9. Apparatus according to claim 8, wherein said first and second semiconductor switching means are first and second transistors each having a collector, an emitter and a base, and wherein said current responsive means includes a feedback transformer with a primary winding and first and second feedback windings and means for interconnecting said transistors and said windings including, means connecting the emitter of said first transistor to said first terminal, means connecting the collector of said first transistor to the emitter of said second transistor and means connecting the collector of second transistor to said second terminal, means connecting said primary winding of said transformer between said third terminal and said collector of said first transistor, means connecting said first feedback winding of said transformer between the emitter and the base of said first transistor, and means connecting said second feedback winding of said transformer between the emitter and the base electrodes of said second transistor.

10. Apparatus of the class described, comprising:
first and second input terminals;
first and second output terminals;
switching means having first, second and third terminals and further having,
first semiconductor switching means connected between said first and third terminals;
second semiconductor switching means connected between said second and third terminals;
current responsive means connected to said third terminal and to each of said first and second semiconductor switching means for operating said semiconductor switching means in response to the current at said third terminal to alternately provide low impedance paths between said third and said first terminals and said third and said second terminals;
means connecting said first terminal of said switching means to said first input terminal and means connecting said second terminal of said switching means to said second input terminal and to said second output terminal;
a plurality of capacitor-diode voltage multiplier stages connected in series between said input and said output terminals, each said stage having,
a pair of diodes connected in series between first and second junction points,
a first capacitor connected between the cathode of said first diode and third junction point,
and a second capacitor connected between the cathode of said second diode and a fourth junction point,
means connecting said third junction point of the first stage in said series of stages to said third terminal of said switching means,
means connecting said first junction of said first stage to said first terminal of said switching means, and
means connecting said second terminal of said switching means to said second output terminal;
means connecting said first junction point of each succeeding stage of said plurality of stages to said second junction point of the immediately preceding stage, and means connecting said third junction point of each succeeding stage to said junction intermediate the two diodes of the immediately preceding stage;

means connecting said fourth junction point of each of said stages to said second output terminal; and means connecting the second junction of the last stage in said series of stages to said first output terminal.

11. Apparatus according to claim 10, wherein said first and second semiconductor switching means are first and second transistors each having a collector, an emitter and a base, and wherein said current responsive means includes a feedback transformer with a primary winding and first and second feedback windings and means for interconnecting said transistors and said windings including, means connecting the emitter of said first transistor to said first terminal, means connecting the collector of said first transistor to the emitter of said second transistor and means connecting the collector of said second transistor to said second terminal, means connecting said primary winding of said transformer between said third terminal and said collector of said first transistor, means connecting said first feedback winding of said transformer between the emitter and the base of said first transistor, and means connecting said second feedback winding of said transformer between the emitter and the base electrodes of said second transistor.

References Cited

UNITED STATES PATENTS

| | | | |
|---|---|---|---|
| 2,975,353 | 3/1961 | Rockstuhl | 321—2 |
| 3,106,672 | 10/1963 | Mills | 321—15 XR |
| 3,210,689 | 10/1965 | Burwen | 331—114 XR |
| 3,334,312 | 8/1967 | Funfstuck | 331—113.1 |
| 2,783,384 | 2/1957 | Bright et al. | 321—2 |
| 3,348,119 | 10/1967 | Webb | 321—2 |

JOHN F. COUCH, *Primary Examiner.*

WILLIAM SHOOP, *Assistant Examiner.*

U.S. Cl. X.R.

307—110; 320—1; 331—113